(12) United States Patent
Selfridge et al.

(10) Patent No.: US 10,012,148 B2
(45) Date of Patent: Jul. 3, 2018

(54) METHOD OF PURGING A COMBUSTOR

(71) Applicant: General Electric Company, Schenectady, NY (US)

(72) Inventors: Kenneth Eugene Selfridge, Piedmont, SC (US); Joshua Adam Bagwell, Taylors, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1057 days.

(21) Appl. No.: 14/285,915

(22) Filed: May 23, 2014

(65) Prior Publication Data
US 2015/0337735 A1 Nov. 26, 2015

(51) Int. Cl.
*F02C 7/232* (2006.01)

(52) U.S. Cl.
CPC ........ *F02C 7/232* (2013.01); *F05D 2260/602* (2013.01); *F05D 2260/607* (2013.01)

(58) Field of Classification Search
CPC . F02C 7/23; F05D 2260/602; F05D 2260/607
USPC .......................................................... 60/779
See application file for complete search history.

(56) References Cited

U.S. PATENT DOCUMENTS

| | | | | |
|---|---|---|---|---|
| 6,145,294 A * | 11/2000 | Traver | ...... | F23K 5/18 60/39.094 |
| 6,256,975 B1 * | 7/2001 | Dobbeling | ..... | B64D 37/26 60/39.094 |
| 7,726,112 B2 * | 6/2010 | Dooley | ..... | F01D 21/06 60/39.094 |
| 2004/0000296 A1 * | 1/2004 | Linna | ...... | F02D 41/003 123/549 |
| 2011/0146807 A1 * | 6/2011 | Bassmann | ..... | F02C 7/222 137/15.05 |
| 2011/0289927 A1 * | 12/2011 | Wagner | ..... | F02C 7/232 60/734 |
| 2012/0178006 A1 * | 7/2012 | Kani | ...... | C01B 3/384 429/423 |
| 2013/0098041 A1 * | 4/2013 | Zhang | ..... | F23K 5/005 60/734 |
| 2013/0167935 A1 * | 7/2013 | Lawson | ..... | F02C 7/22 137/1 |
| 2013/0199576 A1 * | 8/2013 | Poole | ...... | F23K 5/18 134/22.12 |
| 2013/0291547 A1 * | 11/2013 | Ochiai | ..... | F02C 7/00 60/772 |
| 2013/0318993 A1 * | 12/2013 | Erickson | ..... | F02C 7/22 60/779 |
| 2014/0305512 A1 * | 10/2014 | Bagwell | ..... | F23R 3/28 137/15.06 |

(Continued)

FOREIGN PATENT DOCUMENTS

EP 0952317 A3 10/1999
EP 1184623 A2 6/2002

*Primary Examiner* — Jason T Newton
(74) *Attorney, Agent, or Firm* — GE Global Patent Operation; Robert D. Crawford, II

(57) ABSTRACT

A method of purging a combustor is provided. The method includes opening an isolation valve configured to regulate a flow rate of a fluid sent to at least one fuel nozzle of a combustor. The method also includes opening a control valve located upstream of the isolation valve after opening the isolation valve, wherein the isolation valve and the control valve are located within a fluid supply line.

20 Claims, 2 Drawing Sheets

(56) References Cited

U.S. PATENT DOCUMENTS

| | | | |
|---|---|---|---|
| 2015/0337735 A1* | 11/2015 | Selfridge | F02C 7/232 |
| | | | 60/779 |
| 2016/0341429 A1* | 11/2016 | Selfridge | F23R 3/36 |
| 2016/0348594 A1* | 12/2016 | Selfridge | F02C 7/232 |
| 2017/0138268 A1* | 5/2017 | Nakahara | F02C 7/232 |
| 2017/0254270 A1* | 9/2017 | Okada | F02C 7/232 |

* cited by examiner

METHOD OF PURGING A COMBUSTOR

BACKGROUND OF THE INVENTION

The subject matter disclosed herein relates to gas turbine fuel systems and, more particularly, a method of purging a fluid supply line of a combustor.

Industrial gas turbine engines have fuel supply systems that require a liquid fuel purge system to clear the fuel nozzles in the combustors of liquid fuel. The liquid fuel purge system flushes out any remaining liquid fuel from nozzles of a combustor assembly with a flow of a fluid therethrough. As the purging fluid is routed through a fluid supply line of the liquid fuel purge system, multiple valves in series are manipulated to regulate the flow rate of the fluid therein. If the valves are opened and closed simultaneously or if an upstream control valve is opened before a downstream valve, the upstream valve may be set to a higher flow rate set point due to inherent dynamic response characteristics of the upstream valve. Such a condition may result in an overshoot of water to the nozzles.

BRIEF DESCRIPTION OF THE INVENTION

According to one aspect of the invention, a method of purging a combustor is provided. The method includes opening an isolation valve configured to regulate a flow rate of a fluid sent to at least one fuel nozzle of a combustor. The method also includes opening a control valve located upstream of the isolation valve after opening the isolation valve, wherein the isolation valve and the control valve are located within a fluid supply line.

According to another aspect of the invention, a method of purging a combustor is provided. The method includes opening a first isolation valve configured to regulate a flow rate of a fluid sent through a fluid supply line to at least one fuel nozzle of a combustor and to a fuel manifold. The method also includes opening a control valve located upstream of the first isolation valve after opening the first isolation valve, wherein the first isolation valve and the control valve are located within the fluid supply line.

According to yet another embodiment of the invention, a combustor purge system includes a fluid supply line configured to route a fluid through at least one fuel nozzle to a combustor. Also included is a control valve disposed within the fluid supply line. Further included is a first isolation valve located within the fluid supply line and downstream of the control valve, wherein the first isolation valve is configured to regulate a flow rate of the fluid. Yet further included is a controller in operative communication with the control valve and the first isolation valve, wherein the controller is configured to open the control valve and the first isolation valve, wherein opening of the control valve occurs subsequent to opening of the first isolation valve.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
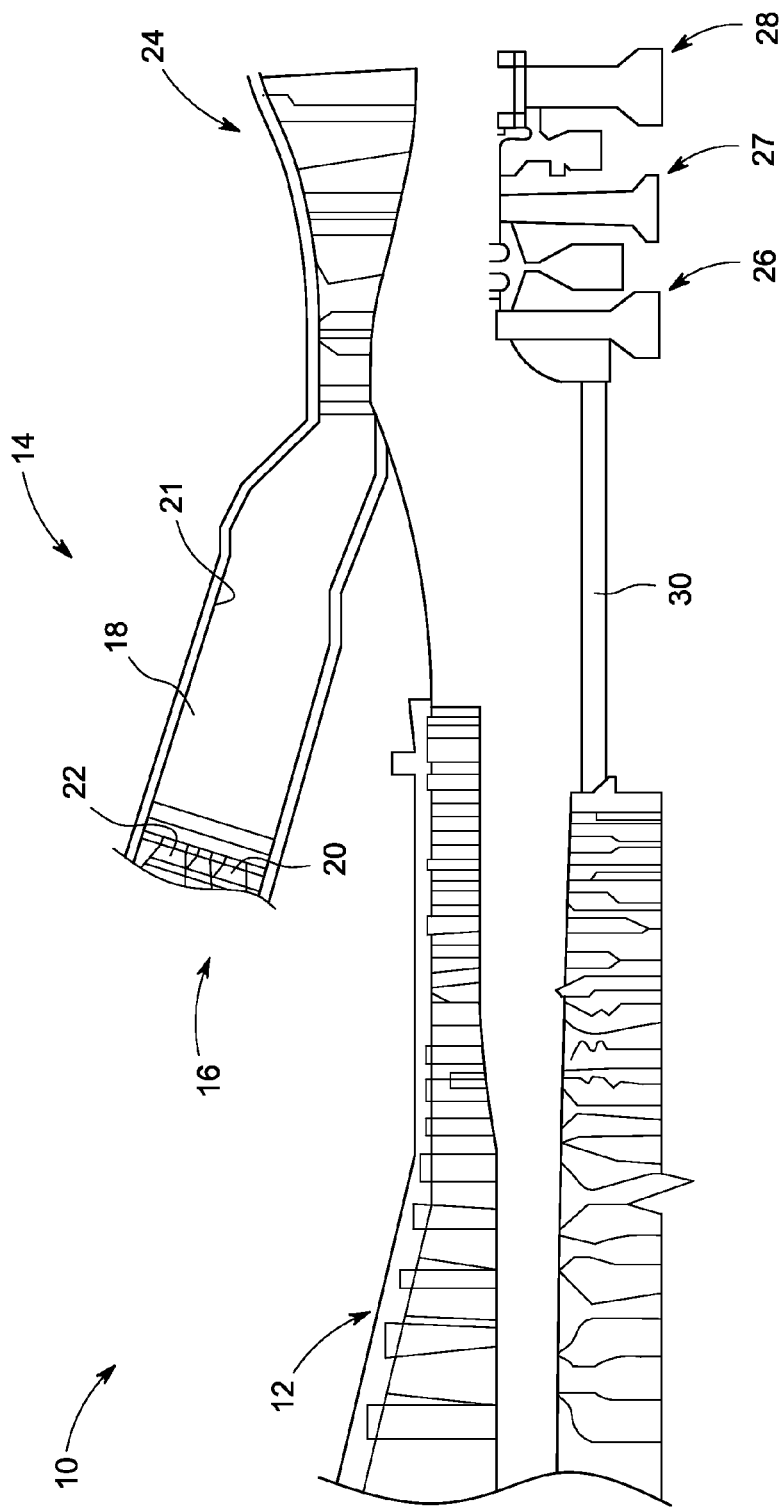
FIG. 1 is a schematic illustration of a gas turbine engine.

Referring to FIG. 1, a turbine system, such as a gas turbine engine 10, constructed in accordance with an exemplary embodiment of the present invention is schematically illustrated. The gas turbine engine 10 includes a compressor section 12 and a plurality of combustor assemblies arranged in a can annular array, one of which is indicated at 14. The combustor assembly is configured to receive fuel from a fuel supply (not illustrated) through at least one fuel nozzle 20 and a compressed air from the compressor section 12. The fuel and compressed air are passed into a combustor chamber 18 defined by a combustor liner 21 and ignited to form a high temperature, high pressure combustion product or air stream that is used to drive a turbine 24. The turbine 24 includes a plurality of stages 26-28 that are operationally connected to the compressor 12 through a compressor/turbine shaft 30 (also referred to as a rotor).

In operation, air flows into the compressor 12 and is compressed into a high pressure gas. The high pressure gas is supplied to the combustor assembly 14 and mixed with fuel, for example natural gas, fuel oil, process gas and/or synthetic gas (syngas), in the combustor chamber 18. The fuel/air or combustible mixture ignites to form a high pressure, high temperature combustion gas stream, which is channeled to the turbine 24 and converted from thermal energy to mechanical, rotational energy.

Figure 2:
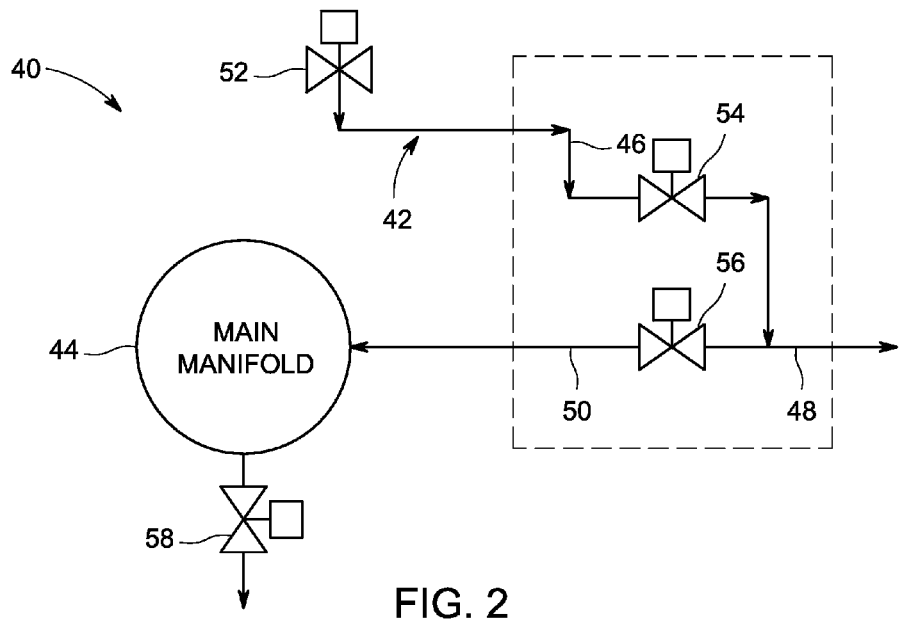
FIG. 2 is a schematic illustration of a fluid supply line of the gas turbine engine.

Referring now to FIG. 2, a purge system 40 is schematically illustrated. The purge system 40 is fluidly coupled to the combustor assembly 14 and is configured to purge various portions of the combustor assembly 14 with a fluid, such as water. Specifically, the purge system 40 includes a fluid supply line 42 that is fluidly coupled to the fuel nozzles of the combustor assembly 14 and a fuel manifold 44 of the combustor assembly 14. As shown a main portion 46 of the fluid supply line 42 is provided and routes the water to a first branch 48 of the fluid supply line 42 and a second branch 50 of the fluid supply line 42. The first branch 48 directs water to the fuel nozzles and the second branch 50 directs water to the fuel manifold 44.

The water is provided to the fuel nozzles and the fuel manifold 44 in a pulsed manner that is facilitated by cyclical opening and closing of various valves within the fluid supply line 42, as will be described in detail below. The overall flow of water to the fluid supply line 42 is regulated by a control valve 52 that is operated by a controller having a flow rate set point that is based on system parameters and conditions that are detected within the purge system 40. A first isolation valve 54 is located downstream of the control valve 52 and provides another layer of regulation of fluid flow rate within the fluid supply line 42. Although a single isolation valve that regulates fluid flow to both the first branch 48 and the second branch 50 of the fluid supply line 42 is contemplated, the illustrated embodiment includes a second isolation valve 56 that is located within the second branch 50 and is specifically configured to regulate fluid flow to the fuel manifold 44. The first isolation valve 54 and the second isolation valve 56 are also configured to be operated by the above-described controller. The controller is therefore in operative communication with the control valve 52, the first isolation valve 54, and the second isolation valve 56. The communication may be direct or remote (e.g., wireless) and facilitates opening and closing manipulation of the valves.

Routing of the water along the first branch 48 to the fuel nozzles results in passage of the water through the fuel nozzles and into the combustor 18. During such a process, the water flows along and into contact with the combustor liner 21 in a pulsed manner. Routing of the water along the second branch 50 to the fuel manifold 44 results in passage of the water through the fuel manifold 44 and is expelled therefrom via valve 58.

A method of purging the combustor assembly 14 of the gas turbine engine 10 is provided to avoid potential damage to the combustor liner 21 during the pulsed purging process. In particular, a valve sequence of the above described valves of the fluid supply line 42 ensures that a flow rate of water to the fuel nozzles is not exceeded during the process.

Figure 3:
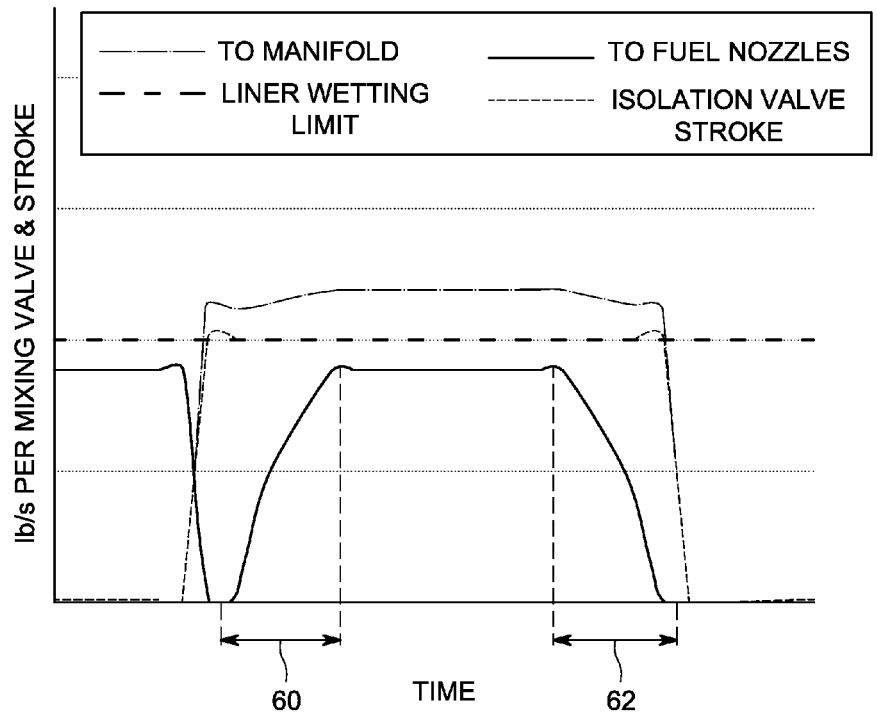
FIG. 3 graphically illustrates a valve sequencing method within the fluid supply line with a plot of fluid flow rate over time.

Referring now to FIG. 3, in conjunction with FIGS. 1 and 2, a plot of flow rate over time depicts a single pulse purge cycle for cyclically distributing fluid flow to the combustor assembly 14. As shown, the control valve 52 is opened subsequent to opening of the first isolation valve 54. The slight lag of opening of the control valve 52 may be based on a fixed time period or a detected system condition, such as pressure detected within the fluid supply line 42 or the combustor 18, for example. The set point associated with the control valve 52 is less prone to system dynamics associated with opening and closing of the valves and therefore reduces the likelihood of an overshoot of water supplied. Similarly, closing of the control valve 52 is done prior to closure of the first isolation valve 54 to provide such confirmation during the valve closing process of the pulse purge cycle. The pulse purge cycle is repeated multiple times to affect the pulsing process. Opening and closing times of the control valve 52 is represented with numerals 60 and 62, respectively. As shown on the plot, the "wetting limit" of the combustor liner 21 is not exceeded with such a valve sequence.

Although the first isolation valve 54 is positioned to regulate fluid flow to both the first branch 48 and the second branch 50, the second isolation valve 56 is operated to adjust for system dynamics associated with the opening and closing process, as well. Specifically, as is the case with the first isolation valve 54, the second isolation valve 56 is opened before the control valve 52 and closed after the control valve 52 during a pulse purge cycle. It is contemplated in various embodiments, that the second isolation valve 56 may be opened simultaneously with the first isolation valve 54, before the first isolation valve 54, or subsequent to the first isolation valve 54. Similarly, the second isolation valve 56 may be closed simultaneously with the first isolation valve 54, before the first isolation valve 54, or subsequent to the first isolation valve 54.

Advantageously, the method described above enables pulse purging of the combustor assembly 14 with water, while ensuring a reduction of damage to the combustor liner 21 that defines the combustor 18. Specifically, an excess supply of water flow to the fuel nozzles is avoided during opening and closing of the valves within the fluid supply line 42. Such a result provides a cost savings to the end user, thereby making the product more desirable to customers.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of purging a combustor comprising:
opening a first valve configured to permit flow of a liquid for purging the combustor to at least one fuel nozzle of the combustor via a fluid supply line; and
opening a second valve located upstream of the first valve after opening the first valve to regulate the flow rate of the liquid through the fluid supply line to the at least one fuel nozzle of the combustor.

2. The method of claim 1, wherein the opening of the second valve is after the opening of the first valve based on a fixed time period.

3. The method of claim 1, wherein the opening of the second valve is after the opening of the first valve based on a predetermined pressure detected in the fluid supply line.

4. The method of claim 1, wherein the liquid routed through the fluid supply line comprises water.

5. The method of claim 4, wherein the liquid is routed along a combustor liner of the combustor and the flow rate of the liquid within the combustor is lower than a predetermined flow rate.

6. The method of claim 1, further comprising:
closing the second valve after the opening of the second valve to stop the flow of the liquid through the fluid supply line; and
closing the first valve after the closing of the second valve to prohibit the flow of the liquid through the fluid supply line;
wherein the opening and closing of the first valve and the opening and closing of the second valve define a pulse purge cycle.

7. The method of claim 6, further comprising a plurality of pulse purge cycles for cyclically distributing the liquid to the combustor for purging the combustor.

8. The method of claim 1, wherein the first valve is an isolation valve and the second valve is a control valve.

9. A method of purging a combustor comprising:
opening a first valve configured to permit flow of a liquid for purging the combustor to at least one fuel nozzle of the combustor and to a fuel manifold via a fluid supply line; and
opening a second valve located upstream of the first valve after opening the first valve to regulate the flow rate of the liquid through the fluid supply line to the at least one fuel nozzle of the combustor and the fuel manifold.

10. The method of claim 9, further comprising opening a third valve prior to opening the second valve and configured to permit flow of the liquid to the fuel manifold for purging the fuel manifold, wherein the third valve is located downstream of the first valve.

11. The method of claim 10, further comprising:
closing the second valve after the opening of the second valve to stop the flow of the liquid through the fluid supply line to the at least one fuel nozzle and the fuel manifold;

closing the first valve after the closing of the second valve to prohibit the flow of the liquid through the fluid supply line to the at least one fuel nozzle and the manifold; and closing the third valve after the closing of the second valve to prohibit the flow of the liquid to the manifold;

wherein the opening and closing of the first valve, the opening and closing of the second valve, and the opening and closing of the third valve define a pulse purge cycle.

12. The method of claim 11, further comprising a plurality of pulse purge cycles for cyclically distributing the liquid to the combustor for purging the combustor and the fuel manifold.

13. The method of claim 10, wherein the first and third valves are isolation valves and the second valve is a control valve.

14. The method of claim 9, wherein the opening of the second valve is after the opening of the first valve based on a fixed time period.

15. The method of claim 9, wherein the opening of the second valve is after the opening of the first valve based on a predetermined pressure detected in the fluid supply line.

16. The method of claim 9, further comprising:
closing the second valve after the opening of the second valve to stop the flow of the liquid through the fluid supply line; and
closing the first valve after the closing of the second valve to prohibit the flow of liquid through the fluid supply line;
wherein the opening and closing of the first valve and the opening and closing of the second valve define a pulse purge cycle.

17. The method of claim 9, further comprising opening a third valve simultaneously with the opening of the first valve to permit flow of the liquid to the fuel manifold for purging the fuel manifold, wherein the third valve is located downstream of the first valve.

18. The method of claim 9, wherein the liquid routed through the fluid supply line comprises water.

19. The method of claim 9, wherein the liquid is routed along a combustor liner of the combustor and the flow rate of the fluid within the combustor is lower than a predetermined flow rate.

20. A method of purging a combustor comprising:
opening and closing a first valve in a pulsed manner, the first valve configured to permit flow of a liquid for purging the combustor to at least one fuel nozzle of the combustor via a fluid supply line; and
opening and closing a second valve while the first valve is open, the second valve disposed upstream of the first valve and configured to regulate the flow rate of the liquid through the first valve and fluid supply line to the at least one fuel nozzle of the combustor;
wherein the opening and closing of the first valve and the second valve are opened and closed to provide a flow of the liquid in a pulsed manner along a combustor liner of the combustor to provide liquid contact with the combustion liner below a wetting limit of the combustor liner.

* * * * *